(12) United States Patent
Lepird et al.

(10) Patent No.: US 12,337,869 B2
(45) Date of Patent: *Jun. 24, 2025

(54) STATE ESTIMATION AND RESPONSE TO ACTIVE SCHOOL VEHICLES IN A SELF-DRIVING SYSTEM

(71) Applicant: FORD GLOBAL TECHNOLOGIES, LLC, Dearborn, MI (US)

(72) Inventors: John Russell Lepird, Pittsburgh, PA (US); Patrick Stirling Barone, Saratoga, CA (US); Alexander Wah Tak Metz, Bavaria (DE)

(73) Assignee: Ford Global Technologies, LLC, Dearborn, MI (US)

( * ) Notice: Subject to any disclaimer, the term of this patent is extended or adjusted under 35 U.S.C. 154(b) by 209 days.

This patent is subject to a terminal disclaimer.

(21) Appl. No.: 17/813,390

(22) Filed: Jul. 19, 2022

(65) Prior Publication Data

US 2024/0025441 A1    Jan. 25, 2024

(51) Int. Cl.
| | | |
|---|---|---|
| *B60W 30/09* | (2012.01) | |
| *B60W 40/04* | (2006.01) | |
| *B60W 60/00* | (2020.01) | |
| *G06N 7/01* | (2023.01) | |

(52) U.S. Cl.
CPC ........ *B60W 60/0011* (2020.02); *B60W 30/09* (2013.01); *B60W 40/04* (2013.01); *G06N 7/01* (2023.01); *B60W 2554/402* (2020.02); *B60W 2554/404* (2020.02); *B60W 2556/20* (2020.02)

(58) Field of Classification Search
CPC .. B60W 60/0011; B60W 40/04; B60W 30/09; B60W 60/0017; B60W 2554/402; B60W 2556/20; B60W 2554/404; B60W 2554/4045; B60W 2050/0025; G06V 20/58; G06N 7/01; G06N 20/00; G06N 3/08
See application file for complete search history.

(56) References Cited

U.S. PATENT DOCUMENTS

| | | | | |
|---|---|---|---|---|
| 5,281,949 A | * | 1/1994 | Durley ................. | G01S 13/931 340/901 |
| 9,187,088 B1 | * | 11/2015 | Ferguson ............... | G06N 20/00 |
| 9,280,710 B1 | * | 3/2016 | Ferguson ............. | G06V 20/582 |
| 9,302,678 B2 | | 4/2016 | Murphy et al. | |

(Continued)

*Primary Examiner* — Stephen Holwerda
(74) *Attorney, Agent, or Firm* — Frank A. MacKenzie; Brooks Kushman P.C.

(57) ABSTRACT

Disclosed is a system, method, and computer program product embodiments for estimating the state of a school transportation vehicle. For example, the method includes capturing sensor data that includes information about an environment of an autonomous vehicle. The method further includes detecting a school transportation vehicle in the sensor data, receiving a list of indicators associated with a set of candidate states for the school transportation vehicle, and analyzing data from one or more sources to determine indicator values. The method further includes using the indicator values to compute a probability mass function that includes a likelihood that the school transportation vehicle is in each of the candidate states. The method further includes imposing one or more goals on a motion control system of the autonomous vehicle based on the probability mass function and causing the autonomous vehicle to operate according to the one or more goals.

20 Claims, 11 Drawing Sheets

(56) References Cited

U.S. PATENT DOCUMENTS

| | | | |
|---|---|---|---|
| 9,463,794 B1 * | 10/2016 | Silver | G05D 1/0274 |
| 9,558,411 B1 * | 1/2017 | Ferguson | G05D 1/0246 |
| 9,939,815 B1 | 4/2018 | Silver et al. | |
| 10,740,630 B1 | 8/2020 | Ferguson et al. | |
| 12,022,365 B2 | 6/2024 | Messia et al. | |
| 2008/0162027 A1 * | 7/2008 | Murphy | G05D 1/0246 |
| | | | 701/1 |
| 2017/0124407 A1 | 5/2017 | Micks et al. | |
| 2022/0024479 A1 | 1/2022 | Mell et al. | |
| 2023/0162508 A1 | 5/2023 | Xia et al. | |
| 2024/0025441 A1 | 1/2024 | Lepird et al. | |
| 2024/0029448 A1 | 1/2024 | Li et al. | |

* cited by examiner

STATE ESTIMATION AND RESPONSE TO ACTIVE SCHOOL VEHICLES IN A SELF-DRIVING SYSTEM

BACKGROUND

Autonomous vehicles (AVs) offer a range of potential benefits to society and to individuals such as mobility solutions for those who cannot drive themselves in the form of ride-sharing or autonomous taxi services, and reducing the number of road collisions that stem from errors in human judgment. AVs use sensors to scan their surroundings for existing and impending situations and use sensor data and other information, including map data and local traffic regulations, to plan their motion. Motion planning is enhanced when the AV is able to synthesize complex information to anticipate and react to impending circumstances before they occur.

This document describes methods and systems that are directed to addressing the problems described above, and/or other issues.

SUMMARY

The details of one or more aspects of the disclosure are set forth in the accompanying drawings and the description below. Other features, objects, and advantages of the techniques described in this disclosure will be apparent from the description and drawings, and from the claims.

The present disclosure describes embodiments related to estimating the state of a school transportation vehicle.

In some embodiments, a method of anticipating an imminent state of a school transportation vehicle is disclosed. The method includes receiving sensor data of an environment near an autonomous vehicle. The method further includes, in response to the sensor data including a representation of a school transportation vehicle, analyzing the sensor data to estimate, from a set of candidate states, a current state of the school transportation vehicle, wherein the candidate states include an actively loading or unloading state, an imminently loading or unloading state, and an inactive state. The method further includes, in response to the estimated current state being either the actively loading or unloading state or the imminently loading or unloading state, causing the autonomous vehicle to slow or stop until the school transportation vehicle is in the inactive state.

In some embodiments, a system is disclosed. The system includes memory and at least one processor coupled to the memory and configured to receive sensor data of an environment near an autonomous vehicle. In response to the sensor data including a representation of a school transportation vehicle, the processor is further configured to analyze the sensor data to estimate, from a set of candidate states, a current state of the school transportation vehicle. The candidate states include an actively loading or unloading state, an imminently loading or unloading state, and an inactive state. In response to the estimated current state being either the actively loading or unloading state or the imminently loading or unloading state, the processor is configured to cause the autonomous vehicle to slow or stop until the school transportation vehicle is in the inactive state.

In some embodiment, a non-transitory computer-readable medium is disclosed. The non-transitory computer-readable medium stores instructions that are configured to, when executed by at least one computing device, cause the at least one computing device to perform operations. The operations include receiving sensor data of an environment near an autonomous vehicle. In response to the sensor data including a representation of a school transportation vehicle, the operations include analyzing the sensor data to estimate, from a set of candidate states, a current state of the school transportation vehicle, wherein the candidate states include an actively loading or unloading state, an imminently loading or unloading state, and an inactive state. In response to the estimated current state being either the actively loading or unloading state or the imminently loading or unloading state, the operations include causing the autonomous vehicle to slow or stop until the school transportation vehicle is in the inactive state.

In some embodiments, a method of operating an autonomous vehicle is disclosed. The method includes, by one or more sensors of an autonomous vehicle, capturing sensor data that includes information about an environment in which the autonomous vehicle is located. The method further includes, by a processor of the autonomous vehicle, detecting a school transportation vehicle in the sensor data and receiving a list of indicators associated with a set of candidate states for the school transportation vehicle. The method further includes analyzing data from one or more sources to determine indicator values and using the indicator values to compute a probability mass function wherein the probability mass function includes a likelihood that the school transportation vehicle is in each the candidate states in the set. The method further includes imposing one or more goals on a motion control system of the autonomous vehicle based on the probability mass function and causing the autonomous vehicle to operate according to the one or more goals.

In some embodiments, a system is disclosed. The system includes one or more sensors of an autonomous vehicle, the sensors configured to capture sensor data that includes information about an environment in which the autonomous vehicle is located, a memory, and at least one processor coupled to the memory and configured to detect a school transportation vehicle in sensor data captured by the one or more sensors. The at least one processor is further configured to receive a list of indicators associated with a set of candidate states for the school transportation vehicle and to analyze data from one or more sources to determine indicator values. The at least one processor is further configured to use the indicator values to compute a probability mass function wherein the probability mass function includes a likelihood that the school transportation vehicle is in each the candidate states in the set, impose one or more goals on a motion control system of the autonomous vehicle based on the probability mass function, and cause the autonomous vehicle to operate according to the one or more goals.

In some embodiments, a non-transitory computer-readable medium is disclosed. The non-transitory computer-readable medium stores instructions that are configured to, when executed by at least one computing device, cause the at least one computing device to perform operations. The operations include, by one or more sensors of an autonomous vehicle, capturing sensor data that includes information about an environment in which the autonomous vehicle is located. The method further includes detecting a school transportation vehicle in the sensor data and receiving a list of indicators associated with a set of candidate states for the school transportation vehicle. The operations further include analyzing data from one or more sources to determine indicator values and using the indicator values to compute a probability mass function wherein the probability mass function includes a likelihood that the school transportation vehicle is in each the candidate states in the set. The operations further include imposing one or more goals on a motion control system of the autonomous vehicle based on the probability mass function and causing the autonomous vehicle to operate according to the one or more goals.

BRIEF DESCRIPTION OF THE DRAWINGS

The accompanying drawings are incorporated into this document and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
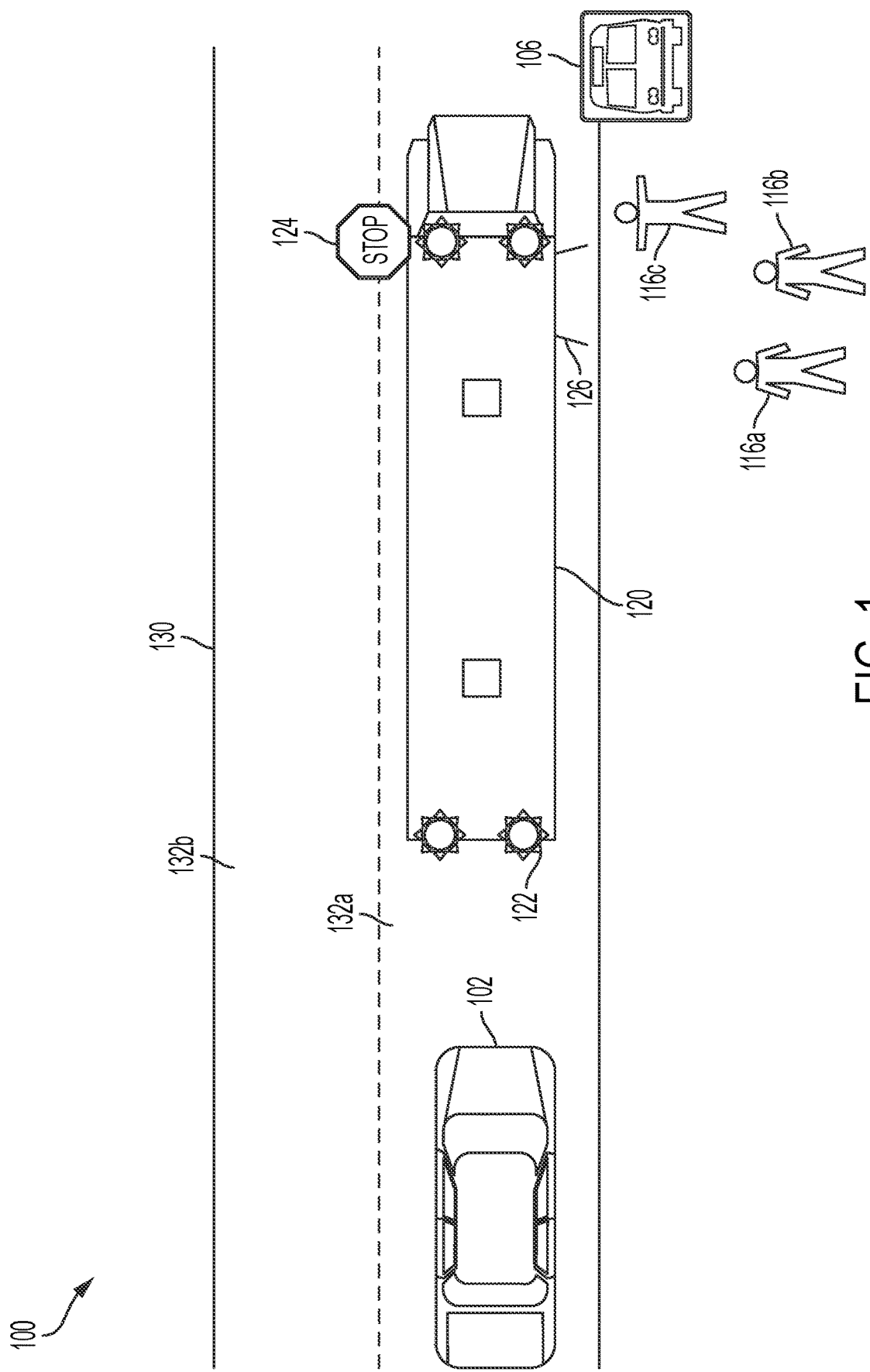
FIG. 1 illustrates an example environment for estimating and the state of an actor.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In this document, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Notably, this document describes the present solution in the context of an AV. However, the present solution is not limited to AV applications.

The term "school bus," "school vehicle," or "school transportation vehicle" refers to a bus, van, or other vehicle used primarily to transport students to and from school.

Definitions for additional terms that are relevant to this document are included at the end of this Detailed Description.

This document describes system, apparatus, device, method and/or computer program product embodiments, and/or combinations and sub-combinations of any of the above, for an autonomous vehicle (AV) or other robotic system to estimate and respond to the state of a school transportation vehicle. For example, the state of a school transportation vehicle, such as a school bus, may be "actively loading or unloading." That is, the school bus may be stopped at a designated bus stop where students are entering (boarding) or leaving (debarking) the school bus. In many or all regions, local traffic laws prohibit passing a school bus in the actively loading or unloading state, even in an opposing lane (unless, e.g., the opposing lane is separated from the school bus by a significant barrier or distance). The school bus may display one or more indications, such as deploying a temporary stop sign and/or displaying red flashing lights, to remind motorists of their obligation to avoid overtaking the school bus during the time that the bus is in this state. Furthermore, the school bus may have other visual cues indicating an active loading or unloading state. For example, the school bus may be stopped at the side of the road and/or may have an open side or rear door, allowing students to board or debark. The environment may provide additional indications or cues that the school bus is in the actively loading or unloading state. For example, the AV may detect other vehicles that are already stopped in the vicinity of the school bus, or may detect students boarding, debarking, or congregating near the one or more doors of the bus. Extrinsic information may also play a role. For example, school buses typically transport students to school during certain times of day, on certain days of the week (that are not also public holidays), and during certain periods of the year. Therefore, calendar and time-of-day information may provide additional context for determining the likely state of the school bus.

When approaching a bus stop, but before coming to a stop, the school bus may display indications that it will imminently be in the actively loading or unloading state. That is, the school bus may provide advance notice that it will, within a relatively short period of time, be stopped to allow students to either enter or leave the bus (or both). For example, the bus may begin to slow down and/or display yellow flashing lights, e.g., prior to stopping and displaying red flashing lights. The environment may provide additional indications that the school bus will imminently be in the actively loading or unloading state. For example, students may be congregating at the side of the roadway, e.g., ahead of the bus. By recognizing that the school bus is in the "imminently loading or unloading" state, the AV may plan its motion in anticipation of the school bus transitioning to the actively loading or unloading state (i.e., the state where students are actively entering and/or leaving the school bus). For example, the AV may begin slowing its own motion and/or increase its following distance from the school bus to be able to more smoothly come to a complete stop as the bus transitions to the actively loading or unloading state. After the school bus completes the loading and/or unloading process, the bus may enter an "inactive" state, i.e., a state that does not implicate specialized traffic regulations that would require other vehicles to slow, stop, and/or refrain from passing the school bus. The "inactive" state may include a state when the school bus is moving but not signaling any intent to stop, as well as a state when the school bus is parked but not actively loading or unloading passengers. The school bus may stow any temporarily deployed stop sign and/or extinguish any red flashing lights that had previously indicated the active loading or unloading state. When the school bus is in the inactive state, the AV's motion planning system may treat the school bus as an ordinary vehicle.

The systems and methods disclosed may be applicable to certain actors other than school vehicles as well. In particular, the disclosure may be extended to vehicles that display visual cues when they are loading or unloading passengers. For example, emergency vehicles may also have a small set of discrete states, each state having an associated set of indications, and with some states associated with particular (e.g., temporary) traffic regulations.

Even if these other actors are not associated with traffic regulations that affect an AV's motion planning (the way a school bus is), the AV's motion planning system may use the actor's determined state for other purposes. For example, the AV's motion planning system may infer the intent and/or a future position, speed, or other aspect of the actor based on the determined state. In the example of a school bus, the AV's motion planning system may infer that a school bus in the active loading or unloading state will remain stationary until it enters the inactive state. Similarly, the AV's motion control system may infer that a school bus in the "imminently loading or unloading" state intends to imminently slow and come to a full stop (so as to be able to load/unload student passengers). This document generally describes systems and methods associated with inferring the state of actors based on signals, indicators, cues and/or other available sources of information, and using early state information to inform motion planning of the AV.

In particular, this document discloses determining the state of an actor, such as a school vehicle, where the state of the actor may implicate additional traffic regulations, and especially determining the state of an actor that may imminently implicate additional traffic regulations.

FIG. 1 illustrates an example environment 100 for estimating and the state of an actor. The environment 100 includes a roadway 130 having two single-vehicle-width lanes 132, 132a, 132b, one for each direction of travel. Here, the roadway is undivided. That is, there is no substantial barrier or other physical separation between the lanes 132a, 132b. Vehicles traveling in the same direction generally occupy the same lane (e.g., 132a, 132b), but may temporarily cross the dashed line into the opposite lane 132, e.g., to overtake another vehicle. In the scenario shown in FIG. 1, an AV 102 is traveling in lane 132a and is following (tracking behind) a school vehicle 120 traveling in the same direction. The school vehicle has stopped at a bus stop 106. The school vehicle has deployed a temporary stop sign 124 and is displaying red flashing lights (e.g., 122) to indicate that it is actively loading and/or unloading passengers 116. As shown, the school vehicle 120 has also opened its side door 126 to allow passengers (e.g., 116a-c), who are waiting at the bus stop, to board. As per traffic regulations, the AV 102 has come to a stop to avoid overtaking the school vehicle 120 while it is in the actively loading or unloading state.

The AV 102 may have one or more imaging sensors, such as cameras, configured to capture images of the environment around the AV 102. AV sensors may also include ranging sensors, such as radar or lidar systems configured to acquire sensor data that includes distances from the sensor(s) to surfaces of objects in the environment, e.g., to create a depth map and/or point cloud. Here, the sensors may have detected one or more indications that the school vehicle 120 is in the actively loading or unloading state, such as flashing lights. However, other indicators may be partly or wholly obscured from the AV's sensors. For example, the AV's sensors may be unable to detect the open side door of the school vehicle 120, e.g., due to the relative positions of the AV 102 and school vehicle, the size of the school vehicle, or other factors.

In some examples, the AV 102 includes a state estimator 200 (FIG. 2) configured to infer the state of a school vehicle (or other actor) based on indicators that are detected from images received by the AV's sensors (and other sources), even though some indicators may not be detected by the AV 102.

Figure 2:
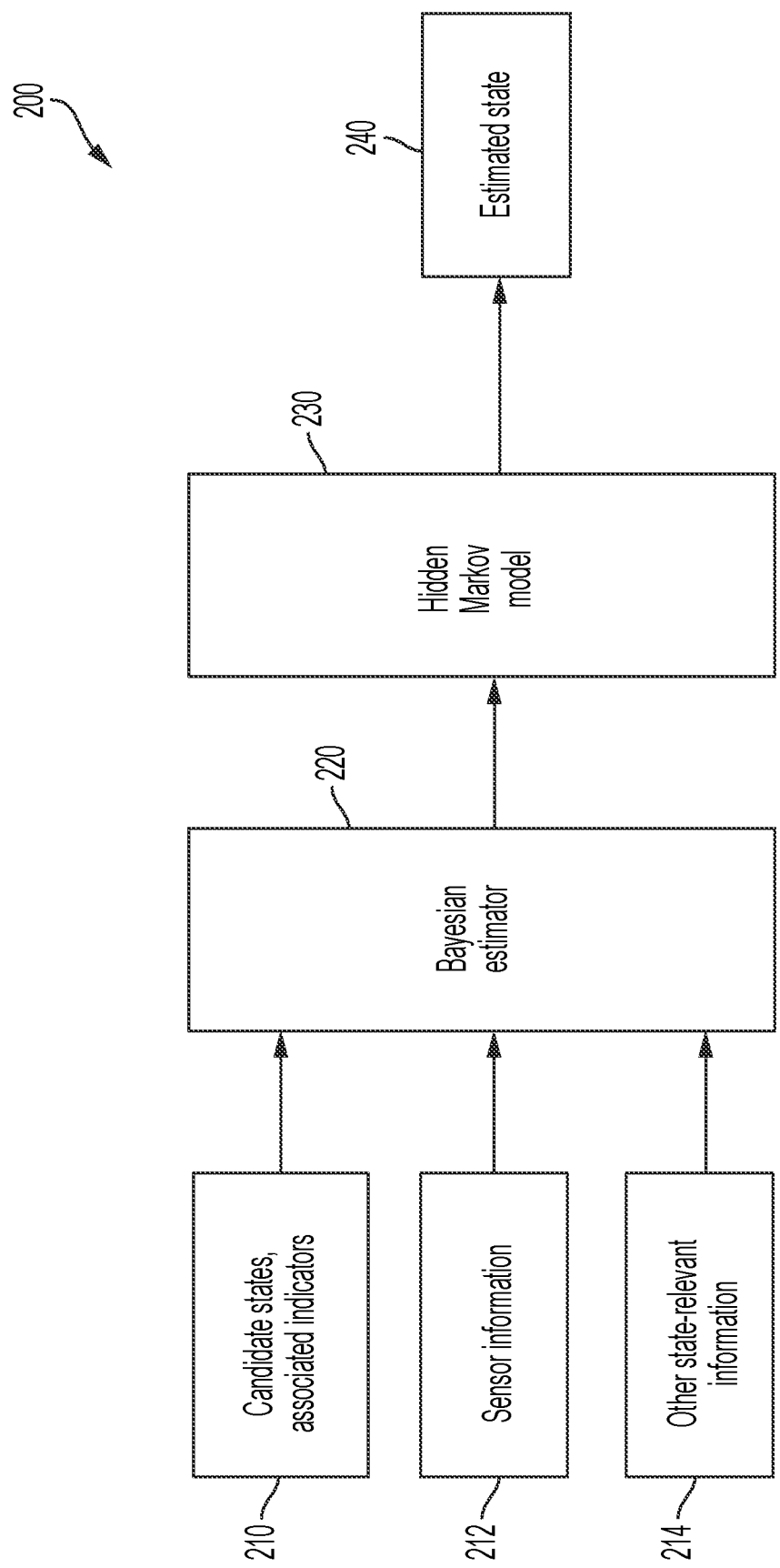
FIG. 2 illustrates a block diagram of an example state estimator.

FIG. 2 illustrates a block diagram of an example state estimator 200. The estimator 200 is configured to estimate the state of the actor from among a set of candidate states 210 for the actor. For example, a school vehicle may have three candidate states from which it may select: (i) actively loading or unloading; (ii) imminently loading or unloading; and (iii) inactive. Other actors may have different sets of candidate states. Each candidate state has an associated set of indicators that are relevant to the state. That is, the indicators make it either more or less likely that the actor is in the associated candidate state. The indicators may include aspects of the actor that can be detected by sensors of the AV 102 or determined based on sensor data, such as the estimated speed of the actor, the distance from the AV 102 to the actor, or the classification applied to the actor by a perception system of the AV 102, where classification may include cyclist, pedestrian, emergency vehicle, school vehicle, and the like. The indicators may also include aspects of the environment surrounding the actor (or the AV 102) that can be detected by sensors of the AV 102. For example, in the case of a school vehicle, these indicators may include the presence of pedestrians (e.g., students) detected congregating at the side of the road, or the behavior of other actors in the environment, e.g., vehicles detected to be stopped but not at a traffic light, stop sign, etc. The indicators may include additional information 214 that may be unrelated to sensor data, such as map information or the time of day or day of the week, or other calendar information that would make it more or less likely that an actor would be in one of the candidate states.

An example (but not exhaustive) list of indicators for the state of a school vehicle is shown in the below table. Some of these indicators may be partially or wholly occluded from the field of view of the AV's sensors, e.g., due to the relative positions of the AV 102 and the actor. For example, the actor's side door may be occluded when the AV 102 is directly behind the actor. Furthermore, one or more of the actor's lights may be broken or inoperative. By evaluating multiple separate signals (indicators) of the actor's state, the AV may more robustly determine the actor's state despite occlusion of some indicators and/or sensor noise or resolution limitations.

| Indicator | Value | Explanation |
| --- | --- | --- |
| Object Type | School vehicle | An actor is unlikely to be in the "actively loading or unloading" state if it is not a school vehicle |
| Object speed | Stopped | The actor is less likely to be in the "actively loading or unloading" state if it is moving |
| Deployed Stop Sign | Detected | The actor is more likely to be in the "actively loading or unloading" state if a stop sign is deployed |

-continued

| Indicator | Value | Explanation |
|---|---|---|
| Open door | Detected | The actor is more likely to be in the "actively loading or unloading" state if one or more door is open |
| Flashing red lights | Detected | The actor is more likely to be in the "actively loading or unloading" state if flashing red lights are displayed |
| Additional hazard lights | Detected | The actor is more likely to be in the "actively loading or unloading" state if additional hazard lights are displayed |
| Flashing yellow lights | Detected | The actor is more likely to be in the "imminently loading or unloading" state if flashing yellow lights are displayed |
| Pedestrian Presence | Detected | The actor is more likely to be in the "actively loading or unloading" state if there are many pedestrians around it |
| Other stopping vehicles | Detected | The actor is more likely to be in the "actively loading or unloading" state if there are other stationary actors (e.g., stopped for unknown reasons) |
| Whether the actor has passengers | Detected | The actor is less likely to be "actively loading or unloading" without passengers, particularly at the end of the school day |
| Time of day | Near start/end of a school day | The actor is more likely to be in the "actively loading or unloading" state or the "imminently loading or unloading" state during typical times of the day |
| Calendar date | School days | The actor is more likely to be in the "actively loading or unloading" state or the "imminently loading or unloading" state during days that school is in session |
| Map information | Residential roads | The actor is more likely to be in the "actively loading or unloading" state or the "imminently loading or unloading" state when in residential areas and on secondary roads, and/or at or near schools, where bus stops are typically located |
| Distance from AV to actor | Less than a threshold | Sensors become less accurate at long range, making it less likely that the actor is actually in the "actively loading or unloading" state based on sensor-based information |

In some examples, the AV's sensors provide sensor data 212 to the AV's perception system at a regular rate, such as 10 Hz. The AV's perception system may process the data to determine values for each indicator at that same rate (e.g., if processing bandwidth allows), or at a slower rate. In the table shown above, several indicators are described in binary terms, e.g., either detected or not detected or present or absent. In mathematical terms, these indicator values may be expressed, by way of example, as percentages, e.g. 0% detected or 100% detected. In these cases, the AV's perception system may also provide a confidence level associated with one or more indicator values. To calculate the confidence level, the system may use sensor-related factors, such as sensor resolution, or measured environmental factors that can affect the quality of sensor data, such as the absence or presence of fog or rain, etc. The confidence level may be applied to indicator values. For example, a 20% confidence level applied to a 100% detected indicator may reduce the indicator value to 80%. Likewise, a 20% confidence level applied to a 0% detected indicator may raise the indicator value to 20%. Other ways of combining confidence levels to indicator values are also in the scope of this disclosure. The confidence level may also relate to an assessment of whether or not the indicator has been detected. For example, the AV's perception system may apply a classifier (or other machine-learning model) to the sensor data to detect the indicator. The classifier may produce an error estimate associated with the classification. For example, the classifier may classify the sensor data as including a temporarily deployed stop sign with a confidence level between 0 and 100%. Other values, such as the actor's speed may also have an associated confidence level. In some examples, the confidence level may include the standard deviation of a distribution of estimated actor speeds.

The AV's perception system may further evaluate the likelihood that an actor is in one or more of the candidate states based on the values (and confidence levels) for each indicator. For example, the AV's perception system may compute a probability mass function (PMF) for the set of candidate states, i.e., the likelihood that the actor is in each of the candidate states. The AV's perception system may weight each indicator differently, e.g., based on the strength of the correlation between the indicator and an associated state or states. For example, the detected flashing red lights may be weighted higher than the speed of the school vehicle. In some examples, the AV's perception system may dynamically adjust the weighting of each indicator, e.g., based on another indicator's value. For example, the AV's perception system may reduce the weight applied to time-of-day indicators if other indicators, such as flashing red lights, are detected.

Alternatively (or in addition), the AV's perception system may apply a trained machine-learning model, such as a neural network or a classifier to indicator values to determine the likelihood that an actor is in one or more of the candidate states. The AV's perception system may then provide the PMF (or the equivalent output from a machine-learning model) to a Bayesian estimator 220 to continually update and maintain the likely state(s) of the actor. In some examples, the AV's perception system applies a statistical model, such as a Hidden Markov Model (HMM) 230 to the output of the Bayesian estimator 220 to provide a temporally filtered PMF for the next state of the actor. That is, the HMM indicates likelihoods of the next state of the actor (from among the candidate states) based on the (unfiltered) output of the Bayesian estimator 220. The AV's perception system may then provide the estimated state 240 (or, e.g., the probability distribution among the candidate states) to the AV's motion planning system for further processing and/or other use.

The motion planning system may use the provided likelihood in a variety of ways. For example, if the likelihood of the actor being in an "active loading or unloading" or "imminently loading or unloading" state is low (e.g., because the actor is not a school bus, or the actor is too far from the sensors of the AV 102 to reliably determine the state of the actor, or because few or none of the indicators had values consistent with those states), the motion planning system may proceed as usual. That is, the motion planning system may proceed without imposing additional goals or restrictions. However, if the likelihood of the actor being in an "active loading or unloading" state is high, the AV's motion planning system may impose additional restrictions. The additional restrictions may be based on local traffic regulations.

In some examples, the AV 102 may access a database of local traffic regulations based on the location of the AV 102. Some or all of the database may be stored within the on-board computing system of the AV 102, and some or all of the database may be accessed from a remote server, e.g., when the AV 102 enters a new regulatory unit, such as a country, state, city, or other municipality. In some examples, the AV 102 uses location data to determine what traffic regulations to access and/or apply. The database may be further indexed or accessed based on a type of actor. For example, the database may include traffic regulations related to school vehicles in each country, state, municipality, or other traffic jurisdiction in which the AV may be operating. The additional restrictions may include (among others) avoiding passing the actor (e.g., in an adjacent lane) and/or avoiding entering an upcoming intersection if the actor is located in or near the intersection (as described in greater detail below). If the likelihood of the actor being in an "active loading or unloading" state is moderate (e.g., there is reasonable uncertainty whether or not the actor is in a candidate state), the AV's motion planning system may impose a goal of maintaining an increased following distance behind the actor during the period that the likelihood remains in the moderate range.

In some examples, the AV's motion planning system determines that the likelihood is in the moderate range using empirically determined criteria. The empirically determined criteria may balance the rate of false positive state classifications and the rate of false negative state classifications by the AV's perception system. The rates of false positive and false negative state classifications may be based on, e.g., labeled training data applied to the AV's perception system. Additionally or alternatively, the rates of false positive and false negative state classifications may be based on operational state classifications performed by the AV's perception system and subsequently confirmed or refuted, e.g., by the AV's perception system. By factoring in likelihood to the state estimation, the AV's motion planning system may more appropriately react to ambiguous circumstances. Furthermore, if the likelihood of the actor being in the "imminently loading or unloading" state is moderate or high, the AV's motion planning system may impose goals specific to that state (and/or likelihood), such as reducing the speed of the AV 102 in preparation for coming to a smooth stop, if needed, at an appropriate distance behind the actor, and beginning the process of slowing even before the actor comes to a stop. The state estimator 200 described above is not limited to the context of school vehicles. The state estimator 200 may classify, e.g., emergency vehicles or other actors having a discrete set of states and a set of indicators, each of which make it more or less likely that the actor is in one of the discrete states. As in the case of school vehicles, the state of an emergency vehicle may cause the AV's motion planning system to impose additional goals and/or restrictions, e.g., based on local traffic regulations.

The goals and/or restrictions of the AV's motion planning system may be used to guide the AV's motion control system. That is, the AV's motion control system may adjust aspects of the AV, such as braking and steering, to meet the goals and/or restrictions imposed by the AV's motion planning system (if possible). The AV's motion control system may be further guided by additional information, including the speed of the AV 102, the speed of the actor, the relative positions of the AV 102 and the actor, aspects of the lanes occupied by the AV 102 (such as wet and/or slick roadways) and aspects of the actor (including the relationship between the lanes occupied by the AV 102 and the actor), vehicle dynamics, and other relevant information. In some circumstances, it may be necessary for the AV's motion control system to override one or more goal or restriction. An example is when, at the time that the AV's motion planning system imposes a restriction of not overtaking an actor in an adjacent lane, the AV 102 is already in the adjacent lane and is already partially overlapped with the actor (or is otherwise unable to avoid overtaking the actor). In some examples, the AV's motion planning system may impose goals specific to the state of "imminently loading or unloading" to reduce the probability of such circumstances arising. For example, when the likelihood of the actor being in an "imminently loading or unloading" state is moderate or high, the AV's motion planning system may impose a goal of eliminating any existing overlap with the actor and/or maintaining at least a minimum following distance behind the actor, even if the actor is in an adjacent lane and not directly ahead of the AV 102. By imposing goals or restrictions specific to the "imminently loading or unloading" state, the AV 102 may react more smoothly to a school vehicle that is approaching a bus stop but has not yet entered the "actively loading or unloading" state.

In some examples, the AV's motion planning system imposes goals or restrictions for more than one possible candidate state. For example, the AV's motion planning system may impose goals or restrictions based on the probability of the actor being in each of two or more states, or, e.g., the probability mass function (PMF) for all candidate states. For example, if the probability of the actor being in any one of the candidate states (e.g., "actively loading or unloading," "imminently loading or unloading," and inactive) are all low (e.g., below a threshold value), or are all relatively similar, the AV's motion planning system may impose goals or restrictions related to the ambiguous state of the actor, until the likelihood of one of the candidate states exceeds a threshold or becomes significantly greater than the likelihoods of the other states. In other words, the AV's motion planning system may impose "soft" goals based on the distribution of probabilities among two or more candidate states of the actor, where the "soft" goals position or prepare the AV to smoothly address whichever candidate emerges as the most probable. In the case of the school vehicle, these goals or restrictions may include slowing down and/or breaking any overlap with the actor.

In some examples, the AV's motion planning system may impose goals based on the PMF of all actors detected by the AV's perception system. For example, the AV's perception system may detect one or more school vehicles, emergency vehicles, and/or other actors. The AV's perception system may compute a probability mass function (PMF) for the set of candidate states for each detected actor. The AV's motion planning system may impose goals based on this aggregate likelihood of the states of some or all of the detected actors.

The AV's motion planning system may use the estimated state of the actor in other ways as well. For example, the AV's motion planning system may use the actor's state to predict future actions (or inactions) of the actor. For example, a school vehicle is likely to remain stopped while in the "actively loading or unloading" state, and a school vehicle is likely to imminently slow and stop when in the "imminently loading or unloading" state. Furthermore, the AV's motion planning system may infer the state of other vehicles in the environment based on the state of the school vehicle. Surrounding vehicles are likely to remain stopped while the school vehicle is in the "actively loading or unloading" state and are likely to slow and stop when the school vehicle is in the "imminently loading or unloading" state.

Figure 3A:
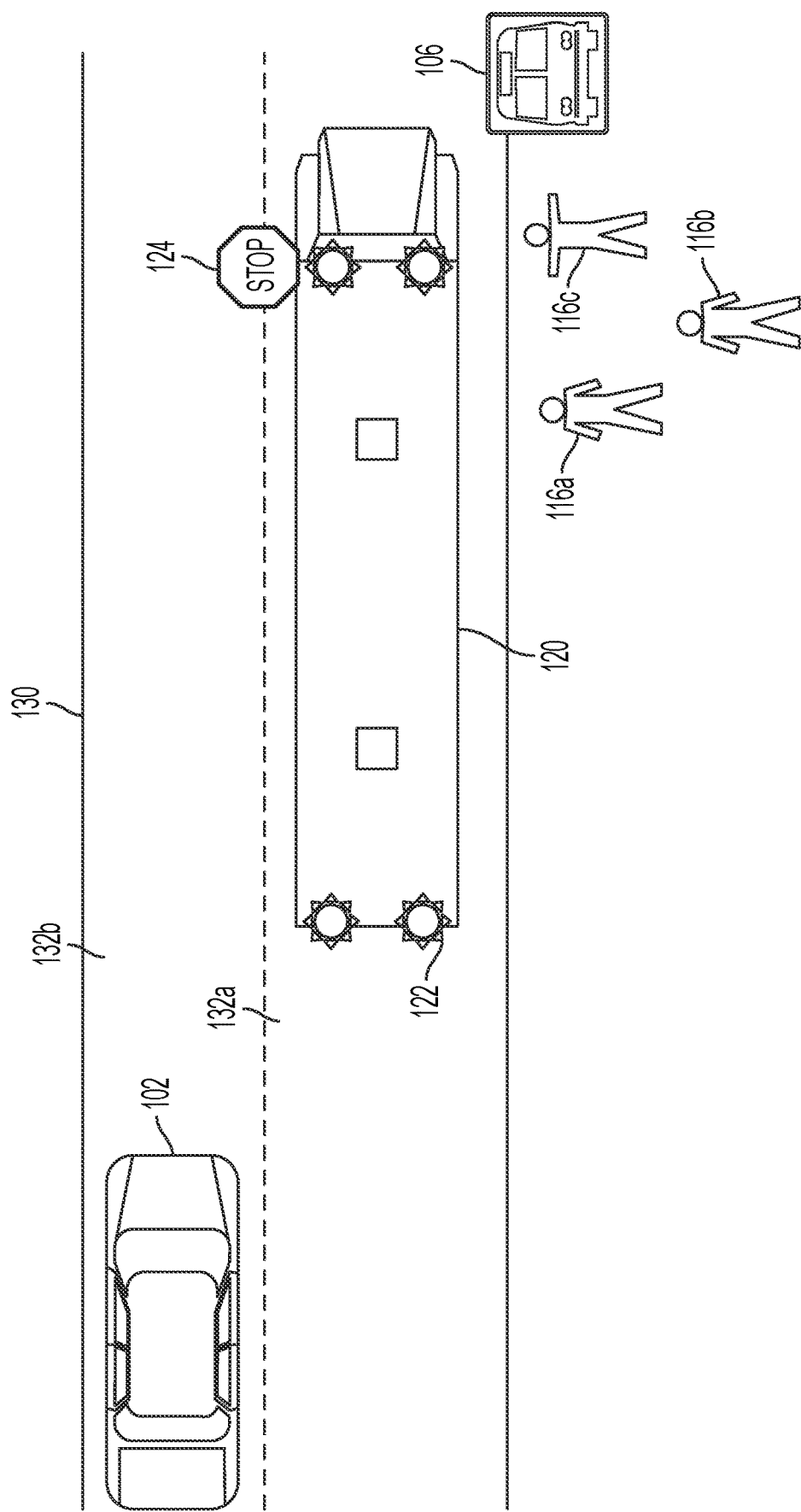
FIGS. 3A-3D illustrate example roadways including school transportation vehicles.
Figure 3B:
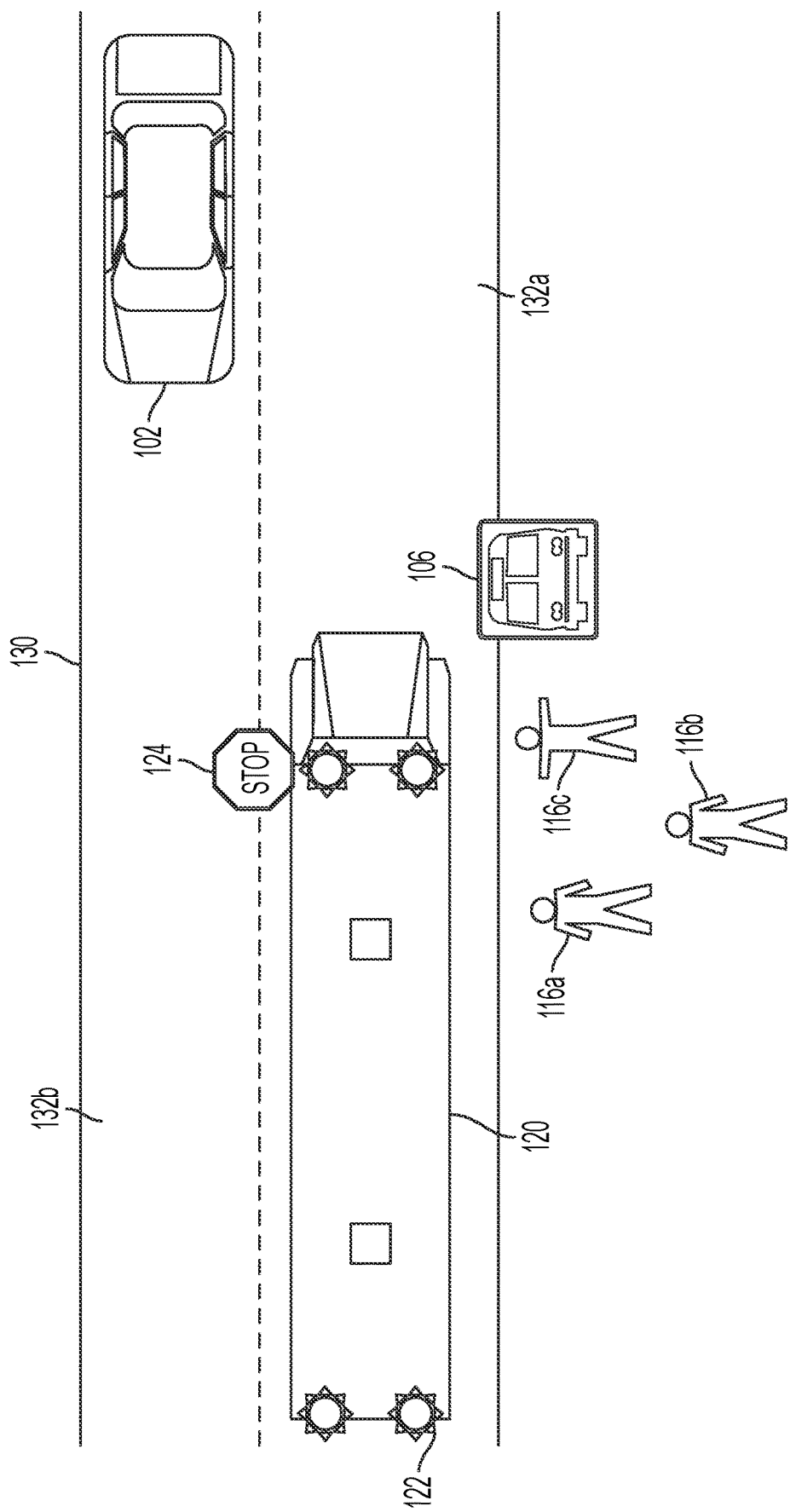
Figure 3C:
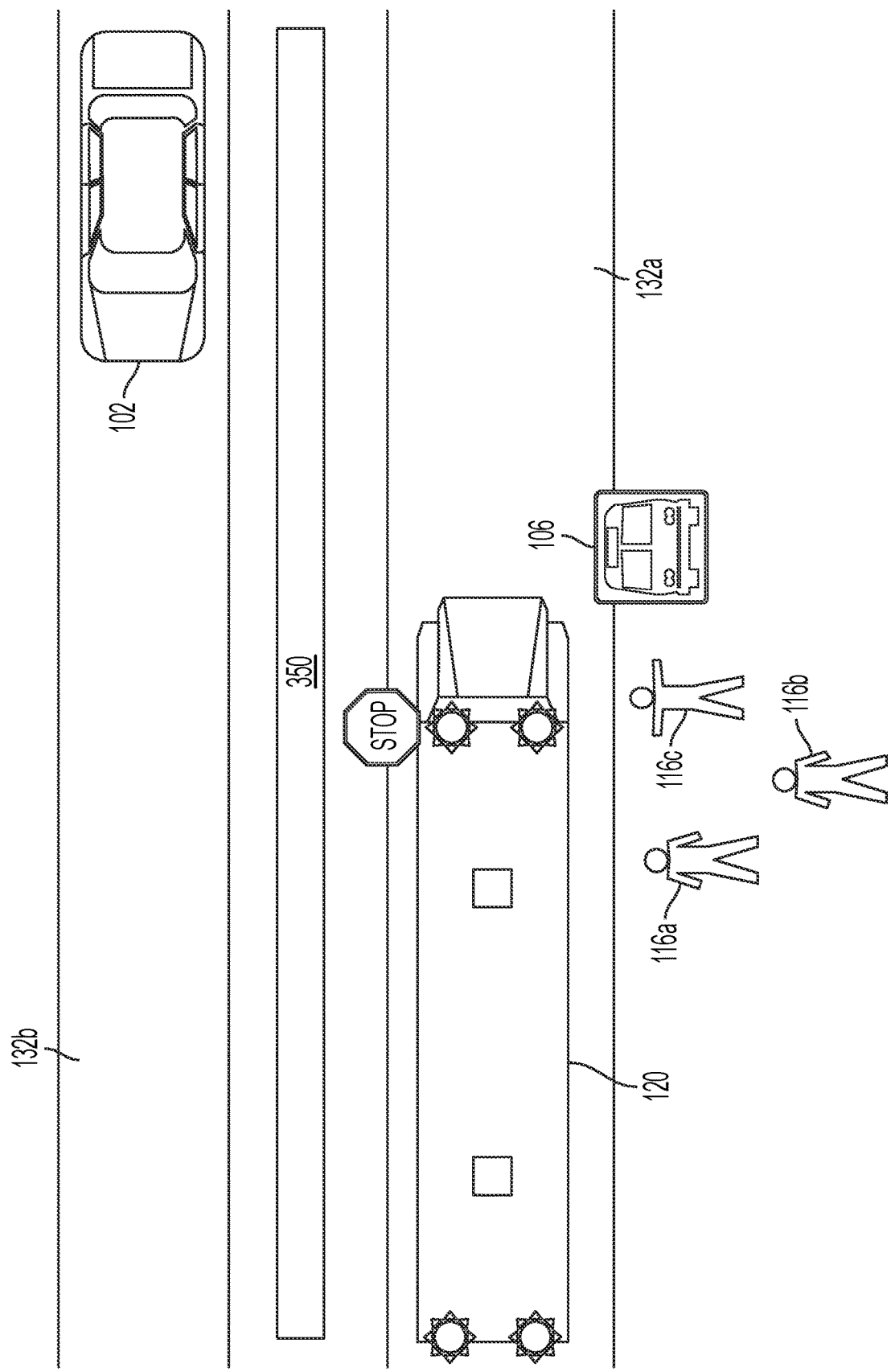
Figure 3D:
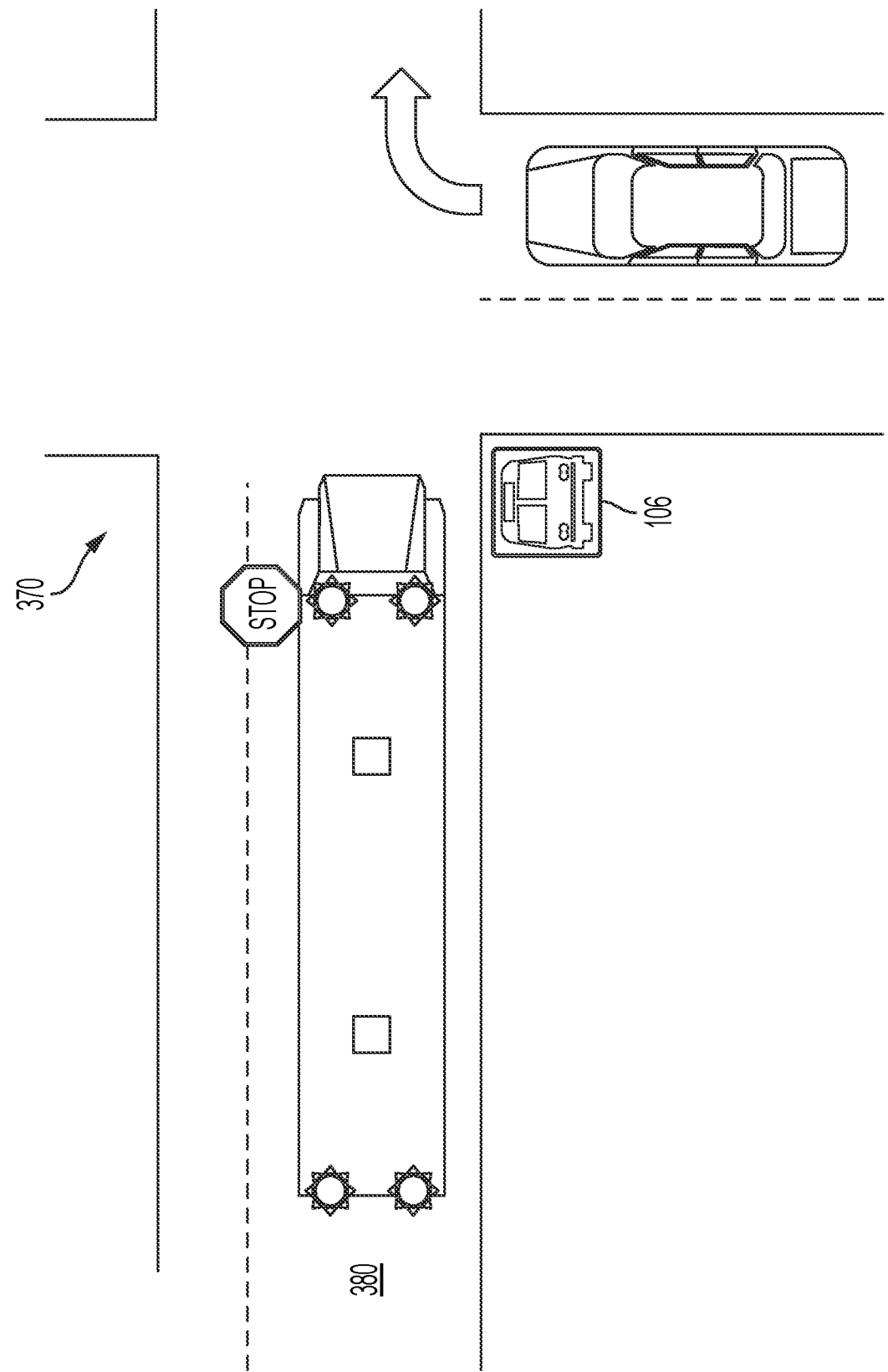

The AV's motion planning system may apply different goals or restrictions based on the configuration of the roadway and/or relative positions of the AV 102 and actor. The preceding discussion largely focused on an AV 102 following the actor in the same lane or an adjacent lane. When the AV 102 is clear ahead of the actor and traveling in the same direction of the actor, the AV's motion planning system may treat the school bus as an ordinary vehicle. That is, the AV's motion planning system may decide to not impose goals or restrictions based on the actor's state. FIGS. 3A-3D illustrate a variety of situations that the AV's motion planning system may address. FIG. 3A illustrates a roadway 130 including two adjacent lanes 132a, 132b having the same direction of travel. The AV 102 and the actor may occupy different lanes as they travel in the same direction. As shown, the actor is in the "actively loading or unloading" state. Here, the local traffic regulations prohibit the AV 102 from overtaking the actor, even though they occupy different lanes. FIG. 3B illustrates a roadway 130 including two adjacent lanes 132a, 132b having the opposite direction of travel. The AV 102 and the actor may travel in opposite directions. As shown, the actor is in the "actively loading or unloading" state. Here, the local traffic regulations prohibit the AV 102 from passing the actor, even though they occupy different lanes. FIG. 3C illustrates a divided roadway including two lanes 132a, 132b having the opposite direction of travel and separated by a divider 350. As shown, the actor is in the "actively loading or unloading" state. However, the local traffic regulations allow the AV 102 to overtake the actor, because the lanes are separated by the divider 350. The divider 350 may be, for example, a concrete divider, longitudinal channelizing devices (LCDs), a Jersey barrier, a median strip, central reservation etc. It should be understood by those of ordinary skill in the art that these are merely examples of dividers and that other types of dividers are further contemplated in accordance with aspects of the present disclosure. FIG. 3D illustrates the intersection 370 of two roadways (and the intersection of two lanes). As shown, the actor is in the "actively loading or unloading" state. Here, the local traffic regulations prohibit the AV 102 from entering the intersection when a school vehicle is in the "actively loading or unloading" state within the intersection 370 or positioned at an inlet 380 to the intersection 370, even if the AV 102 intends to turn away from the school vehicle (e.g., turn right at the intersection shown).

Figure 4:
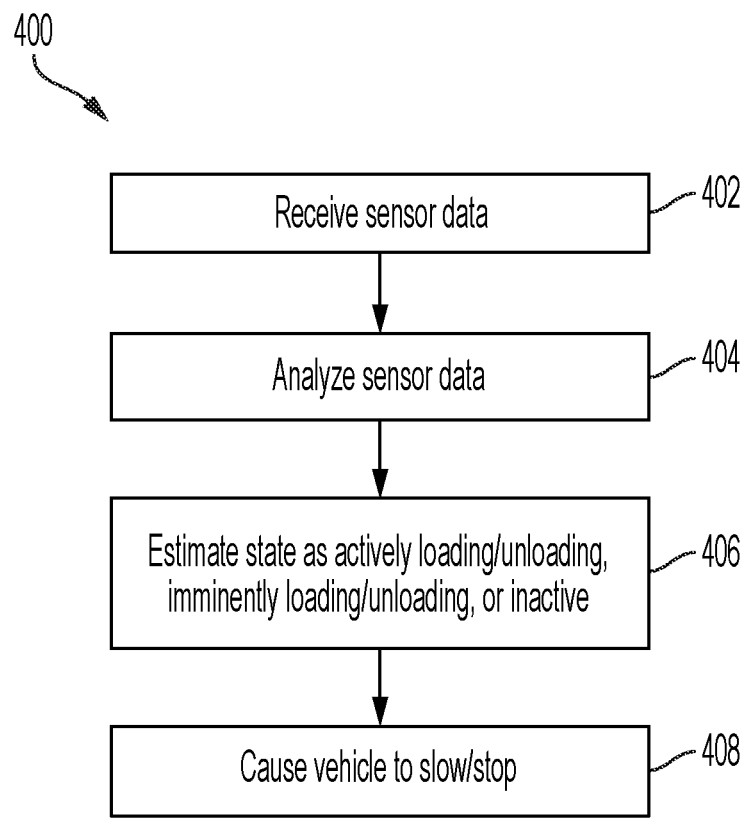
FIG. 4 shows a flowchart of a method of anticipating an imminent state of a school transportation vehicle.

FIG. 4 shows a flowchart 400 of a method of anticipating an imminent state of a school transportation vehicle. At step 402, the method includes receiving sensor data (such as an image) of an environment near an autonomous vehicle. In some examples, receiving the sensor data includes capturing an image or point cloud by one or more sensors of the autonomous vehicle, such as a camera or lidar system. At step 404, the method includes, in response to the sensor data including a rendering or other representation of a school transportation vehicle, analyzing the image to estimate a current state of the school transportation vehicle. In some examples, the autonomous vehicle includes a perception system or other image-processing system configured to identify and/or classify objects in an image. The perception system may use trained machine-learning models to identify and label objects in an image. The perception system may apply one or more bounding boxes to the image, each bounding box containing an identified object. In some examples, the perception system classifies or labels the type of object in the image (or within the bounding box). The perception system may include a machine-learning model trained to recognize school transportation vehicles in an image. The machine-learning model may have been trained using images of school transportation vehicles, or the model may be trained to recognize features associated with school transportation vehicles including, but not limited to, size, color, share, exterior-facing marking, and so forth. The perception system may label an object as a school transportation vehicle when the machine-learning model recognizes the school transportation vehicle in the image (or within the bounding box). Additional details about perception systems and how they may operate will be described below in the discussion of FIG. 8.

In some examples, analyzing the sensor data includes detecting indicators of the state of the object (e.g., school transportation vehicle). An object may have an associated set of candidate states. Each candidate state may have a set of associated indicators. As discussed above, the autonomous vehicle's perception system may detect one or more indicators in the image. For example, the autonomous vehicle's perception system may detect yellow flashing lights, an indicator of the state "imminently loading or unloading." Other candidate states for a school transportation vehicle may include "actively loading or unloading" and inactive. At step 406, the method includes estimate a current state of the school transportation vehicle. In some examples, estimating the state of the actor (e.g., school transportation vehicle) includes computing a probability mass function over all candidate states based on the indicators. In other words, the perception system may compute a likelihood that the actor is in each one of the candidate states based on detected indicators. In some examples, the estimate is based on a probability of each indicator. The likelihood that the actor is in each of the candidate states may depend on the error estimate. For example, if the perception system may detects flashing yellow lights with a 50% error estimate, the perception system may determine a probability that the actor is in the imminently loading or unloading state, and a determine a probability that the actor is instead in the actively loading or unloading state (or the inactive state).

At step 408, the method includes, in response to the estimated state being either actively loading or unloading or imminently loading or unloading, causing the vehicle to slow or stop until the school transportation vehicle is in the inactive state. In some examples, causing the vehicle to slow or stop includes imposing a goal on a motion control system of the vehicle based on the estimated state of the actor. For example, local traffic regulations may prohibit passing a school vehicle in the actively loading or unloading state. Based on the estimated state of the school transportation vehicle and based on local regulations related to the school transportation vehicle, the motion planning system may impose goal of slowing and stopping the autonomous vehicle to avoid passing the school transportation vehicle. The vehicle's motion planning system may generate the command to cause the vehicle to slow or stop, and the vehicle's motion control system may implement the command. Example details about such systems are described below in the discussion of FIG. 8.

Figure 5:
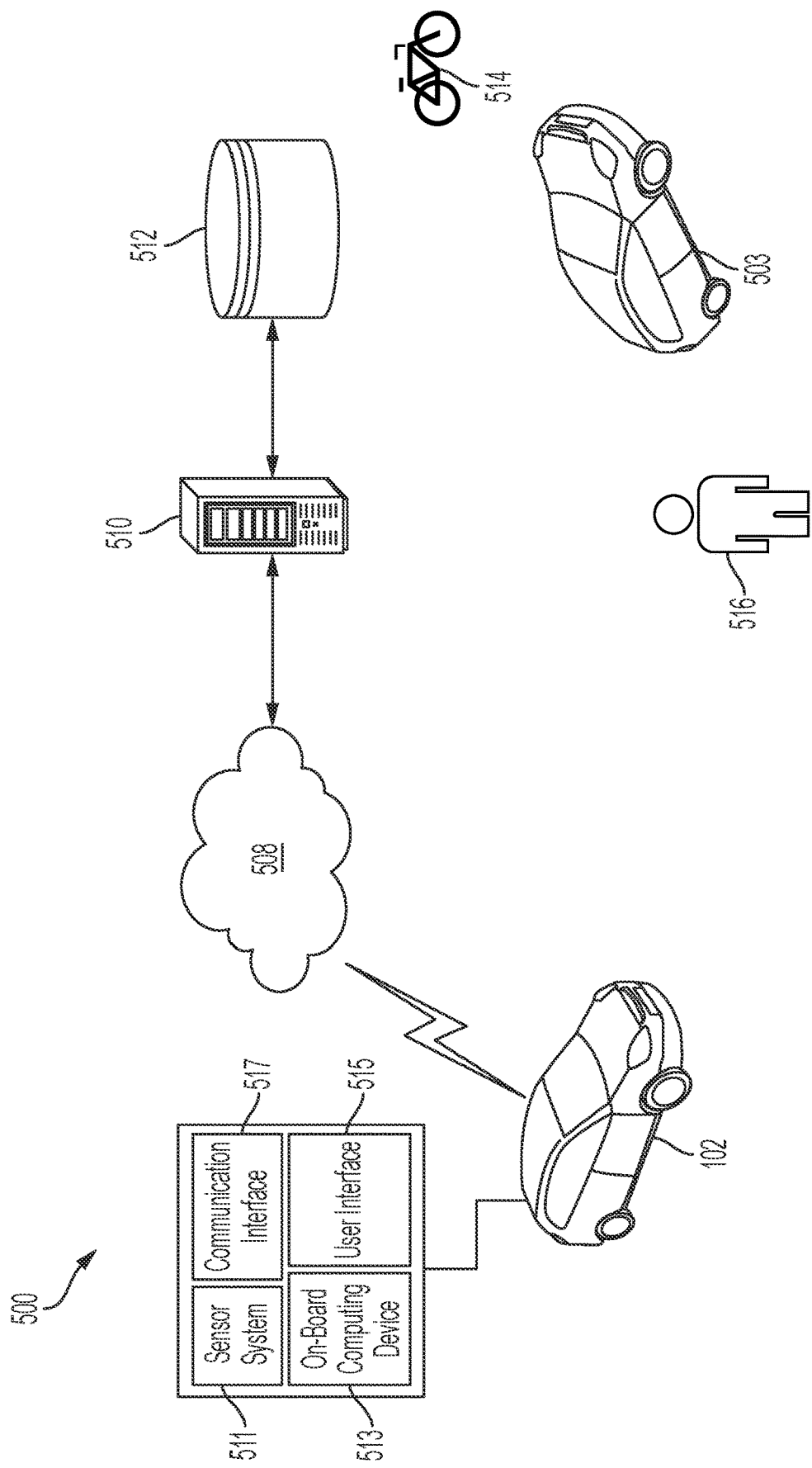
FIG. 5 illustrates an example autonomous vehicle system, in accordance with aspects of the disclosure.

FIG. 5 illustrates an example system 500, in accordance with aspects of the disclosure. System 500 includes a vehicle 102 that is traveling along a road in a semi-autonomous or autonomous manner. Vehicle 102 is also referred to in this document as AV 102. AV 102 can include, but is not limited to, a land vehicle (as shown in FIG. 5), an aircraft, or a watercraft. As noted above, except where specifically noted this disclosure is not necessarily limited to AV embodiments, and it may include non-autonomous vehicles in some embodiments.

AV 102 is generally configured to detect objects in its proximity. The objects can include, but are not limited to, a vehicle 503, cyclist 514 (such as a rider of a bicycle, electric scooter, motorcycle, or the like) and/or a pedestrian 516.

As illustrated in FIG. 5, the AV 102 may include a sensor system 511, an on-board computing device 513, a communication interface 517, and a user interface 515. Autonomous vehicle system 500 may further include certain components (as illustrated, for example, in FIG. 2) included in vehicles, which may be controlled by the on-board computing device 513 using a variety of communication signals and/or commands, such as, for example, acceleration signals or commands, deceleration signals or commands, steering signals or commands, braking signals or commands, etc.

The sensor system 511 may include one or more sensors that are coupled to and/or are included within the AV 102. For example, such sensors may include, without limitation, a lidar system, a radio detection and ranging (radar) system, a laser detection and ranging (LADAR) system, a sound navigation and ranging (sonar) system, one or more cameras (for example, visible spectrum cameras, infrared cameras, etc.), temperature sensors, position sensors (for example, a global positioning system (GPS), etc.), location sensors, fuel sensors, motion sensors (for example, an inertial measurement unit (IMU), etc.), humidity sensors, occupancy sensors, or the like. The sensor data can include information that describes the location of objects within the surrounding environment of the AV 102, information about the environment itself, information about the motion of the AV 102, information about a route of the vehicle, or the like. As AV 102 travels over a surface, at least some of the sensors may collect data pertaining to the surface.

The AV 102 may also communicate sensor data collected by the sensor system to a remote computing device 510 (for example, a cloud processing system) over communications network 508. Remote computing device 510 may be configured with one or more servers to process one or more processes of the technology described in this document. Remote computing device 510 may also be configured to communicate data/instructions to/from AV 102 over network 508, to/from server(s) and/or database(s) 512.

Network 508 may include one or more wired or wireless networks. For example, the network 508 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 508 from database 512. Database 512 may be configured to store and supply raw data, indexed data, structured data, map data, program instructions or other configurations as is known.

The communication interface 517 may be configured to allow communication between AV 102 and external systems, such as, for example, external devices, sensors, other vehicles, servers, data stores, databases, etc. The communication interface 517 may utilize any now or hereafter known protocols, protection schemes, encodings, formats, packaging, etc. such as, without limitation, Wi-Fi, an infrared link, Bluetooth, etc. The user interface system 515 may be part of peripheral devices implemented within the AV 102 including, for example, a keyboard, a touch screen display device, a microphone, and a speaker, etc. The vehicle also may receive state information, descriptive information or other information about devices or objects in its environment via the communication interface 517 over communication links such as those known as vehicle-to-vehicle, vehicle-to-object or other V2X communication links. The term "V2X" refers to a communication between a vehicle and any object that the vehicle may encounter or affect in its environment.

Figure 6:
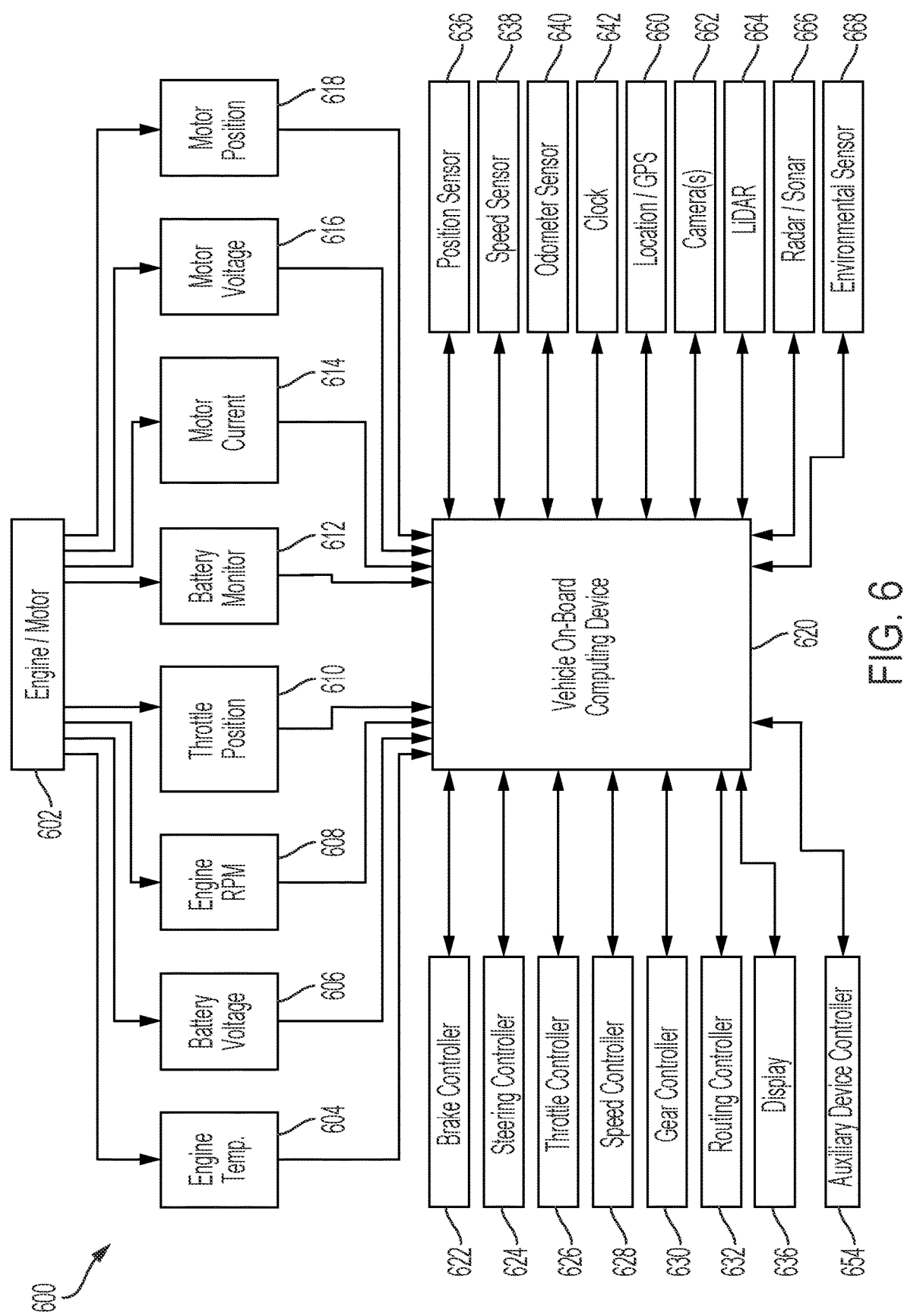
FIG. 6 illustrates an example architecture for a vehicle, in accordance with aspects of the disclosure.

FIG. 6 illustrates an example system architecture 600 for a vehicle, in accordance with aspects of the disclosure. Vehicles 102 and/or 503 of FIG. 5 can have the same or similar system architecture as that shown in FIG. 6. Thus, the following discussion of system architecture 600 is sufficient for understanding vehicle(s) 102, 503 of FIG. 5. However, other types of vehicles are considered within the scope of the technology described in this document and may contain more or less elements as described in association with FIG. 6. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 6, system architecture 600 for a vehicle includes an engine or motor 602 and various sensors 604-618 for measuring various parameters of the vehicle. In gas-powered or hybrid vehicles having a fuel-powered engine, the sensors may include, for example, an engine temperature sensor 604, a battery voltage sensor 606, an engine revolutions per minute ("RPM") sensor 608, and a throttle position sensor 610. If the vehicle is an electric or hybrid vehicle, then the vehicle may have an electric motor, and accordingly includes sensors such as a battery monitoring system 612 (to measure current, voltage and/or temperature of the battery), motor current 614 and voltage 616 sensors, and motor position sensors 618 such as resolvers and encoders.

Operational parameter sensors that are common to both types of vehicles include, for example: a position sensor 636 such as an accelerometer, gyroscope and/or inertial measurement unit; a speed sensor 638; and an odometer sensor 640. The vehicle also may have a clock 642 that the system uses to determine vehicle time during operation. The clock

642 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 660 (such as a Global Positioning System ("GPS") device); object detection sensors such as one or more cameras 662; a lidar system 664; and/or a radar and/or a sonar system 666. The sensors also may include environmental sensors 668 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel. Objects within detectable range of the vehicle may include stationary objects, such as buildings and trees, and moving (or potentially moving) actors, such as pedestrians.

During operations, information is communicated from the sensors to a vehicle on-board computing device 620. The on-board computing device 620 may be implemented using the computer system of FIG. 7. The vehicle on-board computing device 620 analyzes the data captured by the sensors and optionally controls operations of the vehicle based on results of the analysis. For example, the vehicle on-board computing device 620 may control: braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers. Auxiliary device controller 654 may be configured to control one or more auxiliary devices, such as testing systems, auxiliary sensors, mobile devices transported by the vehicle, etc.

Geographic location information may be communicated from the location sensor 660 to the on-board computing device 620, which may then access a map of the environment that corresponds to the location information to determine known fixed features of the environment such as streets, buildings, stop signs and/or stop/go signals. Captured images from the cameras 662 and/or object detection information captured from sensors such as lidar system 664 is communicated from those sensors) to the on-board computing device 620. The object detection information and/or captured images are processed by the on-board computing device 620 to detect objects in proximity to the vehicle. Any known or to be known technique for making an object detection based on sensor data and/or captured images can be used in the embodiments disclosed in this document.

The on-board computing device 620 may include and/or may be in communication with a routing controller 632 that generates a navigation route from a start position to a destination position for an autonomous vehicle. The routing controller 632 may access a map data store to identify possible routes and road segments that a vehicle can travel on to get from the start position to the destination position. The routing controller 632 may score the possible routes and identify a preferred route to reach the destination. For example, the routing controller 632 may generate a navigation route that minimizes Euclidean distance traveled or other cost function during the route, and may further access the traffic information and/or estimates that can affect an amount of time it will take to travel on a particular route. Depending on implementation, the routing controller 632 may generate one or more routes using various routing methods, such as Dijkstra's algorithm, Bellman-Ford algorithm, or other algorithms. The routing controller 632 may also use the traffic information to generate a navigation route that reflects expected conditions of the route (e.g., current day of the week or current time of day, etc.), such that a route generated for travel during rush-hour may differ from a route generated for travel late at night. The routing controller 632 may also generate more than one navigation route to a destination and send more than one of these navigation routes to a user for selection by the user from among various possible routes.

In various embodiments, the on-board computing device 620 may determine perception information of the surrounding environment of the AV 102. Based on the sensor data provided by one or more sensors and location information that is obtained, the on-board computing device 620 may determine perception information of the surrounding environment of the AV 102. The perception information may represent what an ordinary driver would perceive in the surrounding environment of a vehicle. The perception data may include information relating to one or more objects in the environment of the AV 102. For example, the on-board computing device 620 may process sensor data (e.g., lidar or radar data, camera images, etc.) in order to identify objects and/or features in the environment of AV 102. The objects may include traffic signals, roadway boundaries, other vehicles, pedestrians, and/or obstacles, etc. The on-board computing device 620 may use any now or hereafter known object recognition algorithms, video tracking algorithms, and computer vision algorithms (e.g., track objects frame-to-frame iteratively over a number of time periods) to determine the perception.

In some embodiments, the on-board computing device 620 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The on-board computing device 620 may perform one or more prediction and/or forecasting operations. For example, the on-board computing device 620 may predict future locations, trajectories, and/or actions of one or more objects. For example, the on-board computing device 620 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102, the surrounding environment, and/or their relationship(s). Furthermore, the computing device 620 may determine a confidence level associated with one or more predictions. For example, the computing device 620 may determine an error estimate associated with location, speed, direction, and/or other aspect of one or more perceived actors and use the error estimate to predict likely trajectories of the object. If an object is a vehicle and the current driving environment includes an intersection, the on-board computing device 620 may predict whether the object will likely move straight forward or make a turn and determine a likelihood associated with each possibility. If the perception data indicates that the intersection has no traffic light, the on-board computing device 620 may also predict whether the vehicle may have to fully stop prior to entering the intersection.

In various embodiments, the on-board computing device 620 may determine a motion plan for the autonomous vehicle. For example, the on-board computing device 620 may determine a motion plan for the autonomous vehicle based on the perception data and/or the prediction data. Specifically, given predictions about the future locations of proximate objects and other perception data, the on-board computing device 620 can determine a motion plan for the AV 102 that best navigates the autonomous vehicle relative to the objects at their future locations.

For example, for a particular actor (e.g., a vehicle with a given speed, direction, turning angle, etc.), the on-board computing device 620 decides whether to overtake, yield, stop, and/or pass based on, for example, traffic conditions, map data, state of the autonomous vehicle, etc. Furthermore, the on-board computing device 620 also plans a path for the AV 102 to travel on a given route, as well as driving parameters (e.g., distance, speed, and/or turning angle). That is, for a given object, the on-board computing device 620 determines how to cope with the object. For example, for a given object, the on-board computing device 620 may decide to pass the object and may determine whether to pass on the left side or right side of the object (including motion parameters such as speed). The on-board computing device 620 may also assess the risk of a collision between a detected object and the AV 102. If the risk exceeds an acceptable threshold, it may determine whether the collision can be avoided if the autonomous vehicle follows a defined vehicle trajectory and/or performs one or more dynamically generated emergency maneuvers within a pre-defined time period (e.g., N milliseconds). If the collision can be avoided, then the on-board computing device 620 may execute one or more control instructions to perform a cautious maneuver (e.g., mildly slow down, accelerate, change lane, or swerve). In contrast, if the collision cannot be avoided, then the on-board computing device 620 may execute one or more control instructions for execution of an emergency maneuver (e.g., brake and/or change direction of travel).

Figure 7:
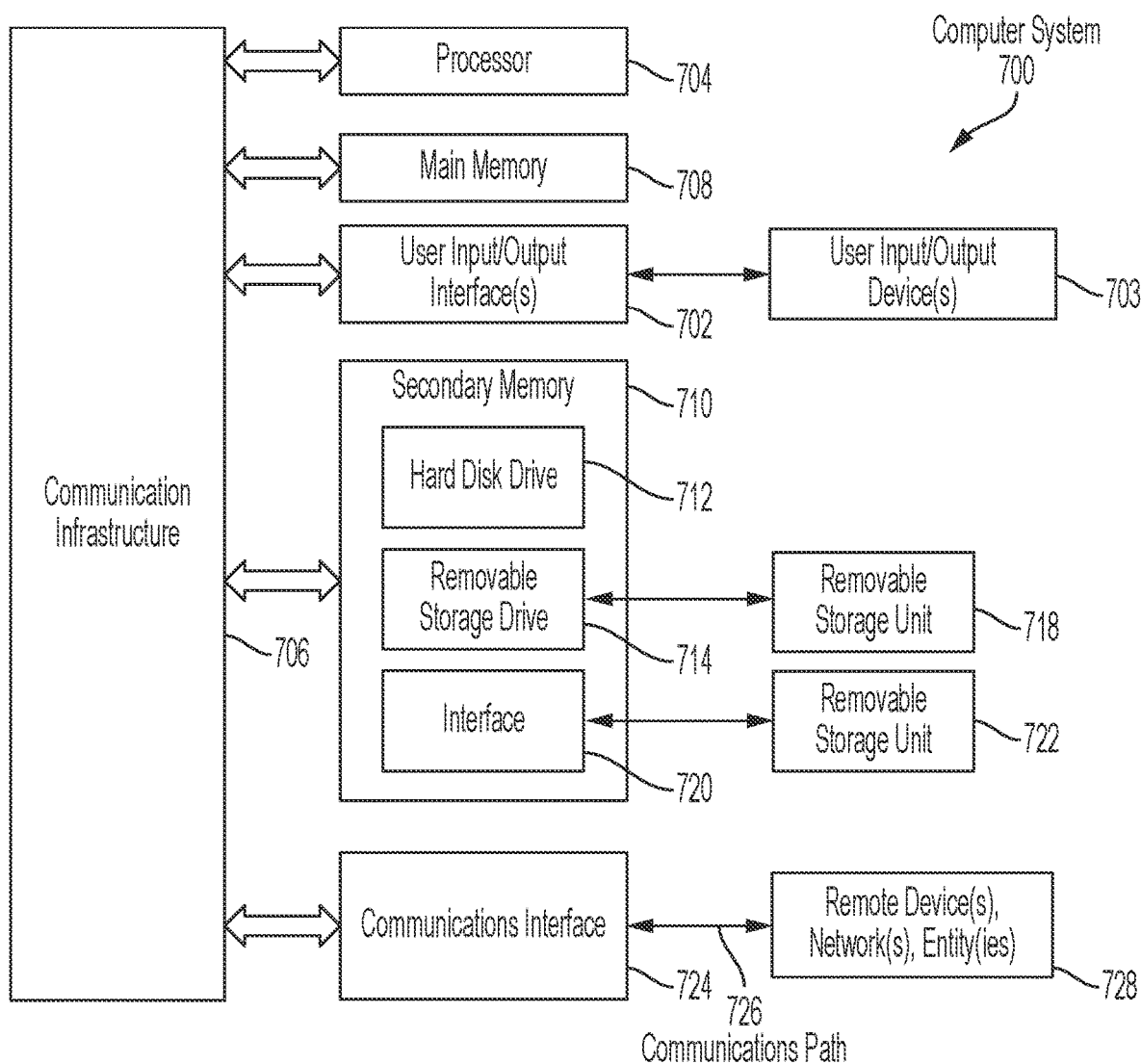
FIG. 7 is an example computer system useful for implementing various embodiments

Various embodiments can be implemented, for example, using one or more computer systems, such as computer system 700 shown in FIG. 7. Computer system 700 can be any computer capable of performing the functions described in this document.

Computer system 700 includes one or more processors (also called central processing units, or CPUs), such as a processor 704. Processor 704 is connected to a communication infrastructure or bus 702. Optionally, one or more of the processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 714 reads from and/or writes to removable storage unit 718 in a well-known manner.

According to an example embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 700, main memory 706, secondary memory 710, and removable storage units 718 and 722, as well as tangible articles of manufacture embodying any combination of the foregoing. Such control logic, when executed by one or more data processing devices (such as computer system 700), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described in this document.

Figure 8:
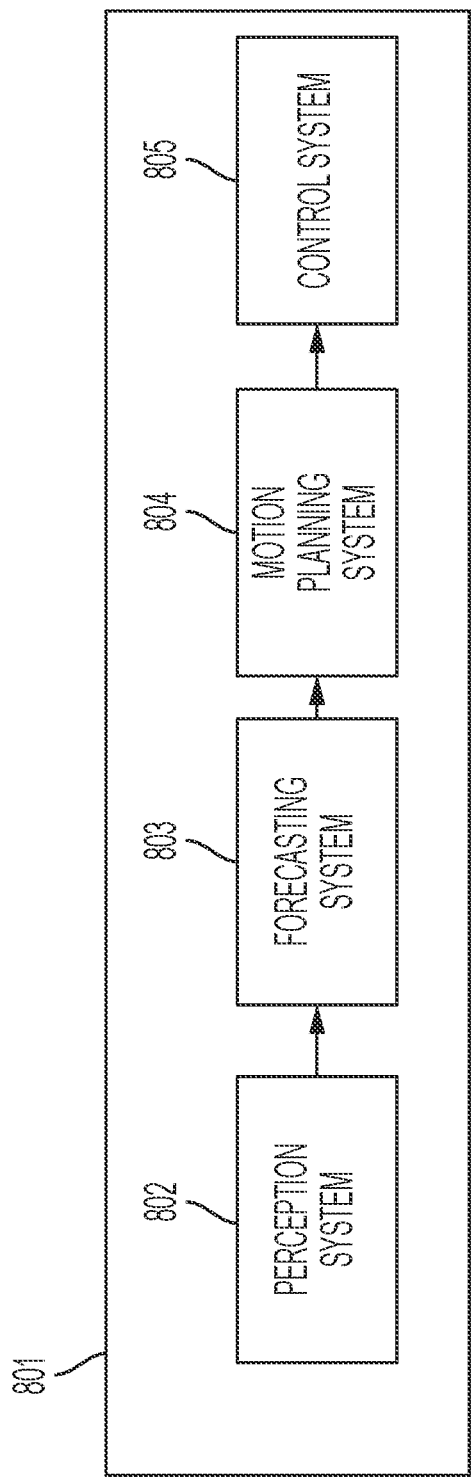
FIG. 8 is a block diagram that illustrates example subsystems of an autonomous vehicle.

FIG. 8 shows a high-level overview of vehicle subsystems that may be relevant to the discussion above. Specific components within such systems are described in the discussion of FIG. 6 in this document. Certain components of the subsystems may be embodied in processor hardware and computer-readable programming instructions that are part of the vehicle on-board computing system 801.

The subsystems may include a perception system 802 that includes sensors that capture information about moving actors and other objects that exist in the vehicle's immediate surroundings. Example sensors include cameras, lidar sensors and radar sensors. The data captured by such sensors (such as digital image, lidar point cloud data, or radar data) is known as perception data. The perception data may include data representative of one or more objects in the environment. The perception system may include one or more processors, along with a computer-readable memory with programming instructions and/or trained artificial intelligence models that, during a run of the vehicle, will process the perception data to identify objects and assign categorical labels and unique identifiers to each object detected in a scene. Categorical labels may include categories such as a vehicle, cyclist, pedestrian, building, and the like. Methods of identifying objects and assigning categorical labels to objects are well known in the art, and any suitable classification process may be used, such as those that make bounding box (or, e.g., cuboid) predictions for detected objects in a scene and use convolutional neural networks or other computer vision models. Some such processes are described in "Yurtsever et al., A Survey of Autonomous Driving: Common Practices and Emerging Technologies" (arXiv Apr. 2, 2020).

If the vehicle is an AV 102, the vehicle's perception system 802 may deliver perception data to the vehicle's forecasting system 803. The forecasting system (which also may be referred to as a prediction system) will include processors and computer-readable programming instructions that are configured to process data received from the perception system and forecast actions of other actors that the perception system detects. For example, the forecasting system 803 may include a machine-learning model training to predict the speed of any or all pedestrians 516 (or other actors) based on an image (or portion of an image) in which the perception system detected the pedestrian 516 (or other actor).

In an AV 102, the vehicle's perception system, as well as the vehicle's forecasting system, will deliver data and information to the vehicle's motion planning system 804 and motion control system 805 so that the receiving systems may assess such data and initiate any number of reactive motions to such data. The motion planning system 804 and control system 805 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause the vehicle hardware to take include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in IEEE Transactions on Intelligent Transportation Systems, vol. 17, no. 4 (April 2016).

Terms that are relevant to this disclosure include:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices. The term "wireless communication" refers to communication between two devices in which at least a portion of the communication path includes a signal that is transmitted wirelessly, but it does not necessarily require that the entire communication path be wireless.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine (SVM) classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have mis-classified. A classifier will be implemented by a processor executing programming instructions, and it may operate on large data sets such as image data, lidar system data, and/or other data.

A "machine learning model" or a "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

A typical machine learning pipeline may include building a machine learning model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. The training set, the validation set, and/or the test set, as well as the machine learning model are often difficult to obtain and should be kept confidential. The current disclosure describes systems and methods for providing a secure machine learning pipeline that preserves the privacy and integrity of datasets as well as machine learning models.

The term "bounding box" refers to a rectangular box that represents the location of an object. A bounding box may be represented in data by x- and y-axis coordinates [xmax, ymax] that correspond to a first corner of the box (such as the upper right corner), along with x- and y-axis coordinates [xmin, ymin] that correspond to the corner of the rectangle that is opposite the first corner (such as the lower left corner). It may be calculated as the smallest rectangle that contains all of the points of an object, optionally plus an additional space to allow for a margin of error. The points of the object may be those detected by one or more sensors, such as pixels of an image captured by a camera, or points of a point cloud captured by a lidar sensor.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

This document uses the term "pedestrian" to include any living actor that is moving or who may move in a scene without riding in a vehicle. The actor may be a human or an animal. The actor may be moving by walking, running, or by using partially or fully human-powered motion assistance items that require human movement for operation, such as roller skates, skateboards, manually-operated scooters and the like. Pedestrians include students waiting to be picked up by a bus.

When used in the context of autonomous vehicle motion planning, the term "trajectory" refers to the plan that the vehicle's motion planning system 804 will generate, and which the vehicle's motion control system 805 will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in in this document.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

In some embodiments, a method of anticipating an imminent state of a school transportation vehicle is disclosed. The method includes receiving sensor data of an environment near an autonomous vehicle. The method further includes, in response to the sensor data including a representation of a school transportation vehicle, analyzing the sensor data to estimate, from a set of candidate states, a current state of the school transportation vehicle, wherein the candidate states include an actively loading or unloading state, an imminently loading or unloading state, and an inactive state. The method further includes, in response to the estimated current state being either the actively loading or unloading state or the imminently loading or unloading state, causing the autonomous vehicle to slow or stop until the school transportation vehicle is in the inactive state.

Implementations of the disclosure may include one or more of the following optional features. In some implementations, causing the autonomous vehicle to slow or stop includes imposing a goal on a motion control system of the autonomous vehicle based on the estimated state of the school transportation vehicle. The imposed goal may be based on a traffic regulation associated with the school transportation vehicle. In some examples, each candidate state has an associated set of indicators and analyzing the sensor data includes detecting one or more of the associated indicators in the sensor data. Analyzing the sensor data may further include computing a probability mass function for the candidate states based on the detected indicators. Causing the autonomous vehicle to slow or stop may include imposing a goal on a motion control system of the autonomous vehicle based on the probability mass function for the candidate states. Analyzing the sensor data to estimate the current state of the school transportation vehicle may further include analyzing a calendar date and/or a time of day. In some examples, the method further includes detecting, based on a subsequent image, a subsequent state of the school transportation vehicle and determining whether the subsequent state corresponds to the anticipated imminent state.

In some embodiments, a system is disclosed. The system includes memory and at least one processor coupled to the memory and configured to receive sensor data of an environment near an autonomous vehicle. In response to the sensor data including a representation of a school transportation vehicle, the processor is further configured to analyze the sensor data to estimate, from a set of candidate states, a current state of the school transportation vehicle. The candidate states include an actively loading or unloading state, an imminently loading or unloading state, and an inactive state. In response to the estimated current state being either the actively loading or unloading state or the imminently loading or unloading state, the processor is configured to cause the autonomous vehicle to slow or stop until the school transportation vehicle is in the inactive state.

Implementations of the disclosure may include one or more of the following optional features. In some implementations, the at least one processor is configured to cause the autonomous vehicle to slow or stop by imposing a goal on a motion control system of the autonomous vehicle based on the estimated state of the school transportation vehicle. The imposed goal may be based on a traffic regulation associated with the school transportation vehicle. In some examples, each candidate state has an associated set of indicators and the at least one processor is configured to analyze the sensor data by detecting one or more of the associated indicators in the sensor data and analyzing the sensor data and computing a probability mass function for the candidate states based on the detected indicators. The at least one processor may be configured to cause the autonomous vehicle to slow or stop by imposing a goal on a motion control system of the autonomous vehicle based on the mass function for the candidate states.

In some embodiment, a non-transitory computer-readable medium is disclosed. The non-transitory computer-readable medium stores instructions that are configured to, when executed by at least one computing device, cause the at least one computing device to perform operations. The operations include receiving sensor data of an environment near an autonomous vehicle. In response to the sensor data including a representation of a school transportation vehicle, the operations include analyzing the sensor data to estimate, from a set of candidate states, a current state of the school transportation vehicle, wherein the candidate states include an actively loading or unloading state, an imminently loading or unloading state, and an inactive state. In response to the estimated current state being either the actively loading or unloading state or the imminently loading or unloading state, the operations include causing the autonomous vehicle to slow or stop until the school transportation vehicle is in the inactive state.

Implementations of the disclosure may include one or more of the following optional features. In some implementations, causing the autonomous vehicle to slow or stop includes imposing a goal on a motion control system of the autonomous vehicle based on the estimated state of the school transportation vehicle. The imposed goal may be based on a traffic regulation associated with the school transportation vehicle. In some examples, each candidate state has an associated set of indicators and analyzing the sensor data includes detecting one or more of the associated indicators in the sensor data. Analyzing the sensor data may further include computing a probability mass function for the candidate states based on the detected indicators. In some examples, causing the autonomous vehicle to slow or stop includes imposing a goal on a motion control system of the autonomous vehicle based on the probability mass function for the candidate states. Analyzing the sensor data to estimate the current state of the school transportation vehicle may further include analyzing a calendar date and/or a time of day.

In some embodiments, a method of operating an autonomous vehicle is disclosed. The method includes, by one or more sensors of an autonomous vehicle, capturing sensor data that includes information about an environment in which the autonomous vehicle is located. The method further includes, by a processor of the autonomous vehicle, detecting a school transportation vehicle in the sensor data and receiving a list of indicators associated with a set of candidate states for the school transportation vehicle. The method further includes analyzing data from one or more sources to determine indicator values and using the indicator values to compute a probability mass function wherein the probability mass function includes a likelihood that the school transportation vehicle is in each the candidate states in the set. The method further includes imposing one or more goals on a motion control system of the autonomous vehicle based on the probability mass function and causing the autonomous vehicle to operate according to the one or more goals.

Implementations of the disclosure may include one or more of the following optional features. In some implementations, the candidate states include an actively loading or unloading state, an imminently loading or unloading state, and an inactive state. The one or more goals may include stopping the autonomous vehicle until the school transportation vehicle is in the inactive state. Using the indicator values to compute the probability mass function may include applying a trained machine-learning model to the indicator values. Analyzing data from the one or more sources to determine the indicator values may further include applying a confidence level to one or more of the indicator values based on aspects of the one or more sensors. At least one of the one or more sources may be a time or date source. In some examples, using the indicator values to compute the probability mass function includes weighting one or more indicator values differently than the other indicator values. In some examples, using the indicator values to compute the probability mass function includes weighting each indicator value differently than each other indicator value.

In some embodiments, a system is disclosed. The system includes one or more sensors of an autonomous vehicle, the sensors configured to capture sensor data that includes information about an environment in which the autonomous vehicle is located, a memory, and at least one processor coupled to the memory and configured to detect a school transportation vehicle in sensor data captured by the one or more sensors. The at least one processor is further configured to receive a list of indicators associated with a set of candidate states for the school transportation vehicle and to analyze data from one or more sources to determine indicator values. The at least one processor is further configured to use the indicator values to compute a probability mass function wherein the probability mass function includes a likelihood that the school transportation vehicle is in each the candidate states in the set, impose one or more goals on a motion control system of the autonomous vehicle based on the probability mass function, and cause the autonomous vehicle to operate according to the one or more goals.

Implementations of the disclosure may include one or more of the following optional features. In some implementations, the candidate states include an actively loading or unloading state, an imminently loading or unloading state, and an inactive state. In some examples, the one or more goals includes stopping the autonomous vehicle until the school transportation vehicle is in the inactive state. The at least one processor may be configured to compute the probability mass function by applying a trained machine-learning model to the indicator values. In some examples, the at least one processor is configured to compute the probability mass function by weighting one or more indicator values differently than the other indicator values.

In some embodiments, a non-transitory computer-readable medium is disclosed. The non-transitory computer-readable medium stores instructions that are configured to, when executed by at least one computing device, cause the at least one computing device to perform operations. The operations include, by one or more sensors of an autonomous vehicle, capturing sensor data that includes information about an environment in which the autonomous vehicle is located. The method further includes detecting a school transportation vehicle in the sensor data and receiving a list of indicators associated with a set of candidate states for the school transportation vehicle. The operations further include analyzing data from one or more sources to determine indicator values and using the indicator values to compute a probability mass function wherein the probability mass function includes a likelihood that the school transportation vehicle is in each the candidate states in the set. The operations further include imposing one or more goals on a motion control system of the autonomous vehicle based on the probability mass function and causing the autonomous vehicle to operate according to the one or more goals.

Implementations of the disclosure may include one or more of the following optional features. In some implementations, the candidate states include an actively loading or unloading state, an imminently loading or unloading state, and an inactive state. In some examples, the one or more goals includes stopping the autonomous vehicle until the school transportation vehicle is in the inactive state. Using the indicator values to compute the probability mass function may include applying a trained machine-learning model to the indicator values. Analyzing data from the one or more sources to determine the indicator values may further include applying a confidence level to one or more of the indicator values based on aspects of the one or more sensors. At least one of the one or more sources may be a time or date source. In some examples, the instructions are configured to cause the at least one computing device to compute the probability mass function by weighting one or more indicator values differently than the other indicator values.

The breadth and scope of this disclosure should not be limited by any of the above-described example embodiments, but should be defined only in accordance with the following claims and their equivalents.

What is claimed is:

1. A method of operating an autonomous vehicle, the method comprising:
   by one or more sensors of an autonomous vehicle, capturing sensor data that includes information about an environment in which the autonomous vehicle is located; and
   by a processor of the autonomous vehicle:
   detecting a school transportation vehicle in the sensor data,
   receiving a list of indicators associated with a set of candidate states for the school transportation vehicle, wherein the indicators include at least one of flashing yellow lights, and a pedestrian presence;
   analyzing data from one or more sources to determine indicator values;
   using the indicator values to compute a probability mass function, wherein the probability mass function comprises a likelihood that the school transportation vehicle is in each the candidate states in the set;
   imposing one or more goals on a motion control system of the autonomous vehicle based on the probability mass function; and
   causing the autonomous vehicle to operate according to the one or more goals.

2. The method of claim 1, wherein the candidate states comprise an actively loading or unloading state, an imminently loading or unloading state, and an inactive state.

3. The method of claim 2, wherein the one or more goals includes stopping the autonomous vehicle until the school transportation vehicle is in the inactive state.

4. The method of claim 1, wherein using the indicator values to compute the probability mass function comprises applying a trained machine-learning model to the indicator values.

5. The method of claim 1, wherein analyzing data from the one or more sources to determine the indicator values further comprises applying a confidence level to one or more of the indicator values based on aspects of the one or more sensors.

6. The method of claim 1, wherein at least one of the one or more sources is a time or date source.

7. The method of claim 1, wherein using the indicator values to compute the probability mass function comprises weighting one or more indicator values differently than the other indicator values.

8. The method of claim 1, wherein using the indicator values to compute the probability mass function comprises weighting each indicator value differently than each other indicator value.

9. A system, comprising:
one or more sensors of an autonomous vehicle, the sensors configured to capture sensor data that includes information about an environment in which the autonomous vehicle is located;
a memory; and
at least one processor coupled to the memory and configured to:
detect a school transportation vehicle in sensor data captured by the one or more sensors;
receive a list of indicators associated with a set of candidate states for the school transportation vehicle, wherein the indicators include at least one of: other stopping vehicles, and hazard lights;
analyze data from one or more sources to determine indicator values;
use the indicator values to compute a probability mass function wherein the probability mass function comprises a likelihood that the school transportation vehicle is in each the candidate states in the set;
impose one or more goals on a motion control system of the autonomous vehicle based on the probability mass function; and
cause the autonomous vehicle to operate according to the one or more goals.

10. The system of claim 9, wherein the candidate states comprise an actively loading or unloading state, an imminently loading or unloading state, and an inactive state.

11. The system of claim 10, wherein the one or more goals includes stopping the autonomous vehicle until the school transportation vehicle is in the inactive state.

12. The system of claim 9, wherein the at least one processor is configured to compute the probability mass function by applying a trained machine-learning model to the indicator values.

13. The system of claim 9, wherein the at least one processor is configured to compute the probability mass function by weighting one or more indicator values differently than the other indicator values.

14. A non-transitory computer-readable medium that stores instructions that are configured to, when executed by at least one computing device, cause the at least one computing device to perform operations comprising:
by one or more sensors of an autonomous vehicle, capturing sensor data that includes information about an environment in which the autonomous vehicle is located; and
by a processor of the autonomous vehicle:
detecting a school transportation vehicle in the sensor data,
receiving a list of indicators associated with a set of candidate states for the school transportation vehicle, wherein the indicators include at least one of: a presence of passengers inside the school transportation vehicle, and speed of the school transportation vehicle;
analyzing data from one or more sources to determine indicator values;
using the indicator values to compute a probability mass function wherein the probability mass function comprises a likelihood that the school transportation vehicle is in each the candidate states in the set;
imposing one or more goals on a motion control system of the autonomous vehicle based on the probability mass function; and
causing the autonomous vehicle to operate according to the one or more goals.

15. The non-transitory computer-readable medium of claim 14, wherein the candidate states comprise an actively loading or unloading state, an imminently loading or unloading state, and an inactive state.

16. The non-transitory computer-readable medium of claim 15, wherein the one or more goals includes stopping the autonomous vehicle until the school transportation vehicle is in the inactive state.

17. The non-transitory computer-readable medium of claim 14, wherein using the indicator values to compute the probability mass function comprises applying a trained machine-learning model to the indicator values.

18. The non-transitory computer-readable medium of claim 14, wherein analyzing data from the one or more sources to determine the indicator values further comprises applying a confidence level to one or more of the indicator values based on aspects of the one or more sensors.

19. The non-transitory computer-readable medium of claim 14, wherein at least one of the one or more sources is a time or date source.

20. The non-transitory computer-readable medium of claim 14, wherein the instructions are configured to cause the at least one computing device to compute the probability mass function by weighting one or more indicator values differently than the other indicator values.

* * * * *